Figure 7:
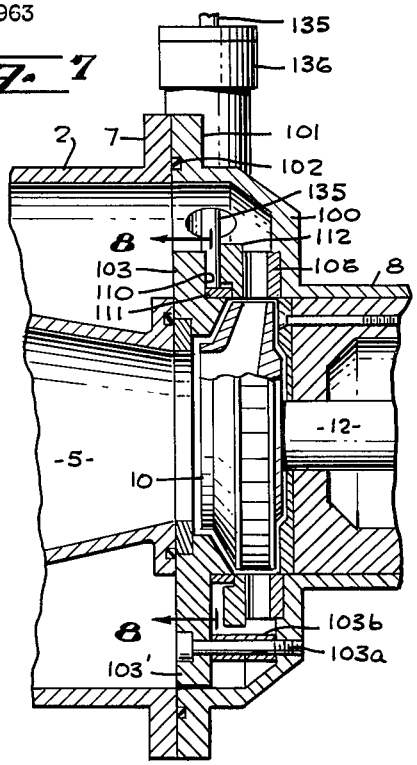

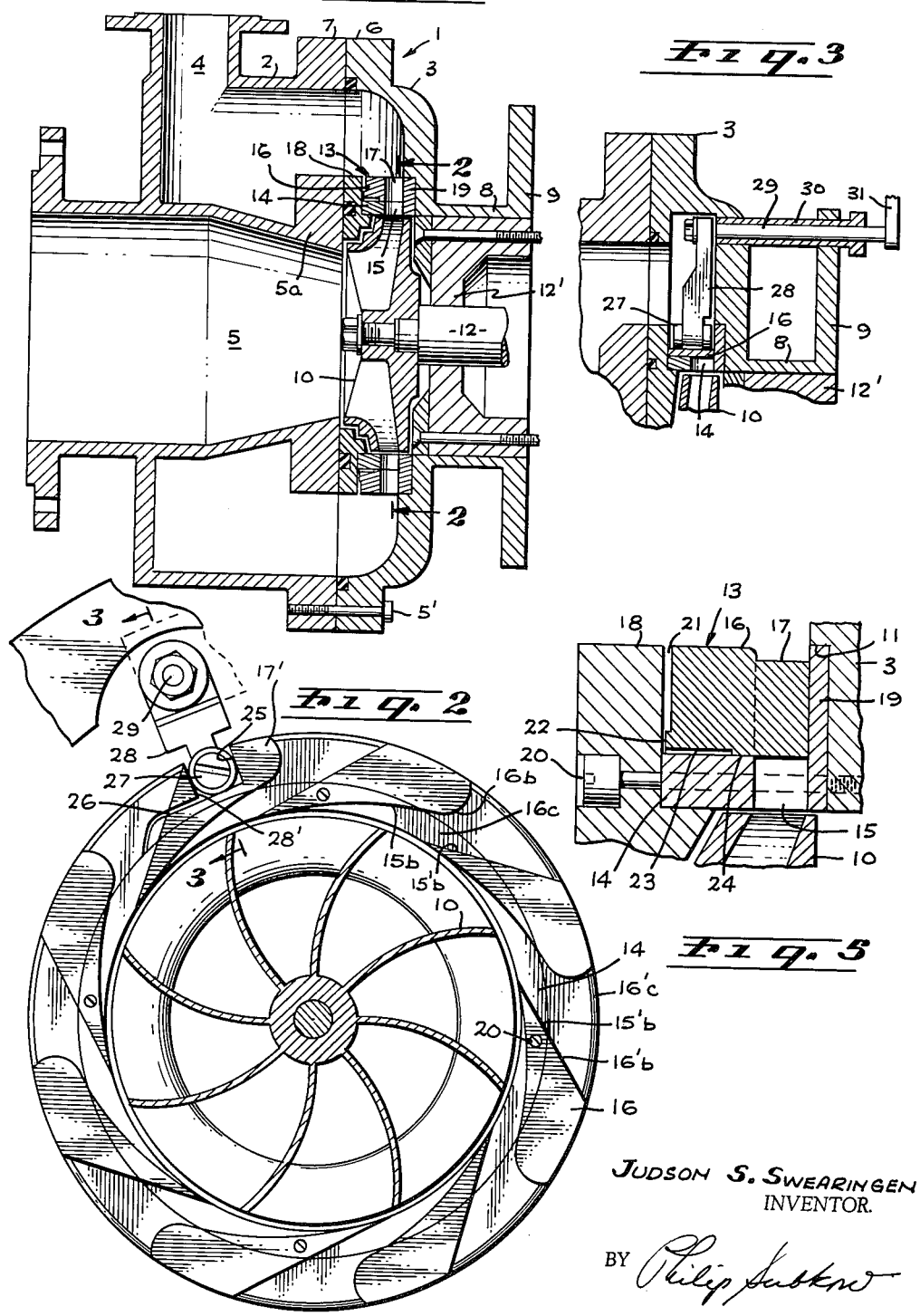

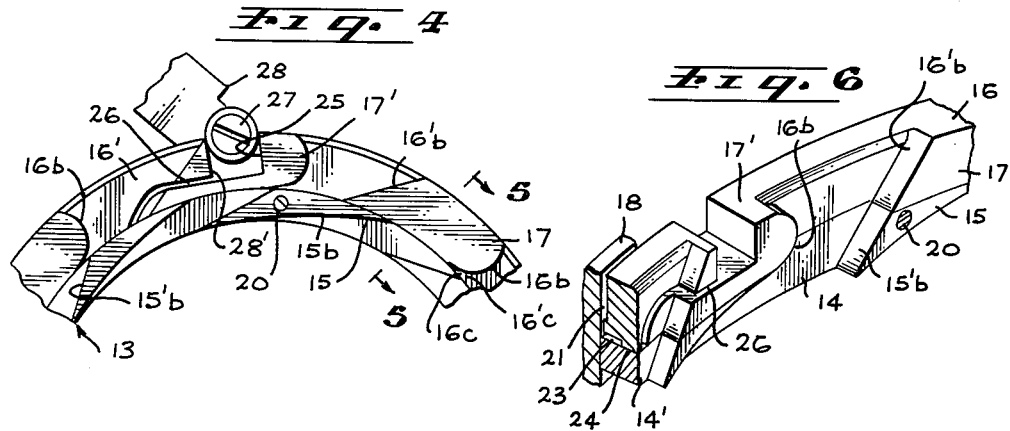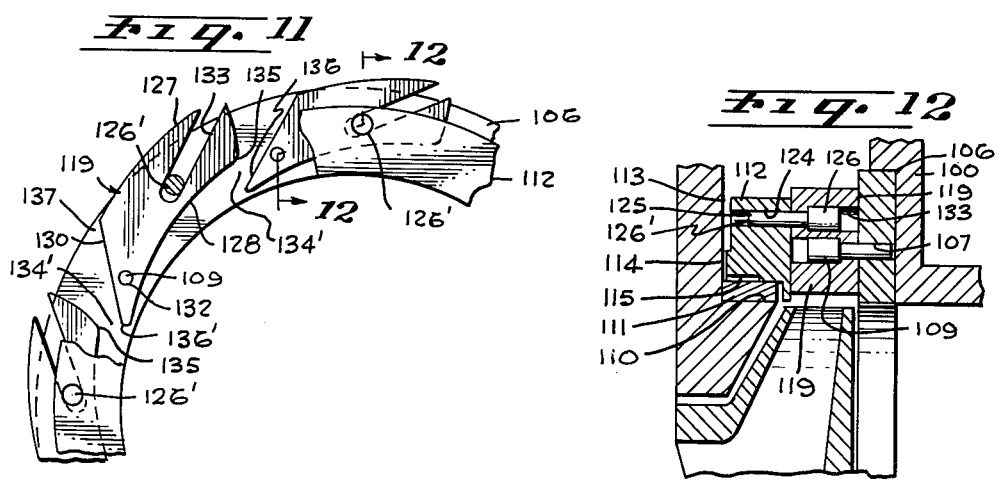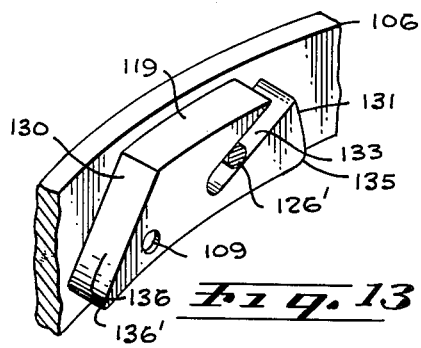

Feb. 1, 1966 J. S. SWEARINGEN 3,232,581
ADJUSTABLE TURBINE INLET NOZZLES
Filed July 31, 1963 3 Sheets-Sheet 3

JUDSON S. SWEARINGEN
INVENTOR.

BY
ATTORNEY

United States Patent Office 3,232,581
Patented Feb. 1, 1966

3,232,581
ADJUSTABLE TURBINE INLET NOZZLES
Judson S. Swearingen, Los Angeles, Calif., assignor to Rotoflow Corporation, Los Angeles, Calif., a corporation of Texas
Filed July 31, 1963, Ser. No. 298,878
17 Claims. (Cl. 253—122)

This application is a continuation-in-part of application Serial No. 230,083, filed October 12, 1962, now abandoned.

This invention relates to turbine constructions. It is especially adapted to radial turbines or other turbines requiring fluid admission into the turbine wheel, through inlet nozzles.

This invention also relates to a device for varying the flow of fluid through the inlet nozzles.

In a preferred embodiment of my invention I provide means for varying the cross-sectional area of the inlet nozzles by a rugged and simple construction.

In my preferred embodiment, I provide an inlet nozzle section composed of a plurality of nozzles positioned around the turbine wheel on two rings. One of said rings carries a plurality of nozzle blades spaced apart circumferentially on the inner ring section. The other ring is movable angularly about the first ring, to change the position of the blade sections to control the flow of fluid passing between the nozzle blades.

It is an object of my invention to provide a seal for the surfaces between the movable rings and between the movable ring and the adjacent surfaces of the turbine assembly.

It is a further object of my invention to seal the contacting surfaces of the nozzle blade sections.

It is thus an object of my invention to cause the fluid to pass substantially entirely through the nozzles into the turbine wheel.

By this means I am able to minimize the leakage from the high-pressure side of the movable ring to the low-pressure side in a manner to avoid by-passing of the nozzle assembly.

It is another object of my invention to so mount the rings that friction at the surfaces of the movable ring be minimized, as an aid in the relatively easy angular adjustment of the ring.

In the preferred form of my invention, the nozzle consists of a plurality of nozzle blade sections, positioned between a movable ring on one side of the nozzles and a nozzle blade cover positioned on the opposite side of the nozzles. This assembly is positioned in the turbine case, concentrically of the turbine wheel. The movable ring is supported on a bearing ring. The fluid pressure acts on the movable ring to compress it about the bearing ring, and is minimized by means of fluid balancing passageways so as to minimize the fluid force tending to compress the movable ring about the bearing ring, while maintaining a seal between the high and low pressure side of the movable ring.

The movable ring is slotted, and means are provided to exert a tangential thrust at one side of the slot. This generates an outward radial thrust on the movable ring, and causes the friction between the slotted movable ring and the bearing ring to be reduced, and aids in the easy adjustment of the movable ring.

In a preferred embodiment of my invention, I employ the movable ring to cause the nozzle blade sections to be angularly adjusted so as to vary the cross-sectional area of the nozzle throats.

In one embodiment of my invention, the nozzle blades are formed in two sections. A stationary ring carries a plurality of stationary nozzle blade sections, spaced about said stationary ring. The movable ring is mounted on the exterior ring surface of the inner stationary ring and carries nozzle blade sections which are spaced about on said movable ring in cooperative relationship with the nozzle blade sections on the stationary ring. The inner stationary ring acts as the bearing ring about which the outer movable ring is adjusted.

The conformation of the blade sections on the two rings is such that, when the blade portion sections on both rings are in registration, they form a nozzle blade with the desired conformation, to provide the maximum nozzle throat opening in this condition.

Means are provided to angularly adjust the outer ring with respect to the inner ring, to cause an angular displacement of the blade sections of the nozzle on the movable ring with respect to the nozzle blade sections on the stationary ring to effectively vary the nozzle throat opening, that is, the smallest cross-sectional area between adjacent circumferentially spaced nozzle blade sections.

The outer ring is annularly recessed on the underneath side adjacent the outer rim of the inner stationary ring, and a fluid-communicating passageway is provided between the outer rim of the movable ring and the annular recess, to minimize the fluid force exerted on the outer rim of the movable ring. Additionally, the fluid-communicating passageway causes an axial force to be exerted on the movable ring, so as to urge it in a direction towards the stationary nozzle blade cover and to apply a force so as to cause a seal between the surfaces positioned at both sides of the nozzle blades. This aids additionally to minimize leakage which by-passes the nozzles.

The movable ring is slotted across the ring from the outer to the inner ring surface. A thrust-generating means is provided, actuable from the exterior of the turbine case, to create a thrust against one side of the slot.

In a modification which is, in my present view of my invention, to be preferred, the stationary ring may also act as the nozzle blade cover, and the movable ring is mounted to be adjacent to and on one side of the nozzle blade cover and concentric therewith. A separate bearing ring is mounted in the case about which the movable ring may be angularly adjusted.

In order to minimize the friction between the support ring and the movable ring, I provide the annular recess and fluid-communicating passageways, as in the case of the previously-described embodiment of my invention. The blade sections are positioned between the movable ring and the inner stationary ring which, as stated, acts in this form as the nozzle blade cover.

The nozzle blades are movable and spaced about said rings. I hinge the nozzle blades on one of the rings and provide a cam slot and cam pin so that when the movable ring is angularly adjusted, the nozzle blade sections pivot on the pivot pin, and the throat sections formed between adjacent nozzle blades are varied in cross-sectional area.

In my preferred embodiment, the cam slot is formed in the nozzle blades. The cam pin is positioned in the nozzle blade cover, and the pivot pin in the movable ring. As in the previous form, the movable ring is slotted, and the thrust means creates a tangential thrust force on the ring at one side of the slot.

Figure 10:
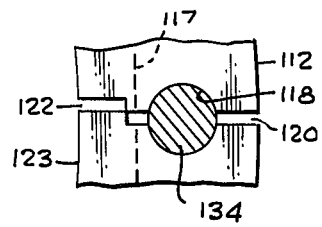
Figure 9:
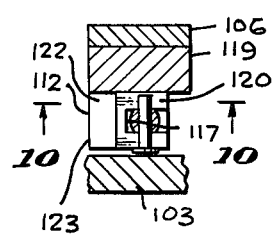
Figure 8:
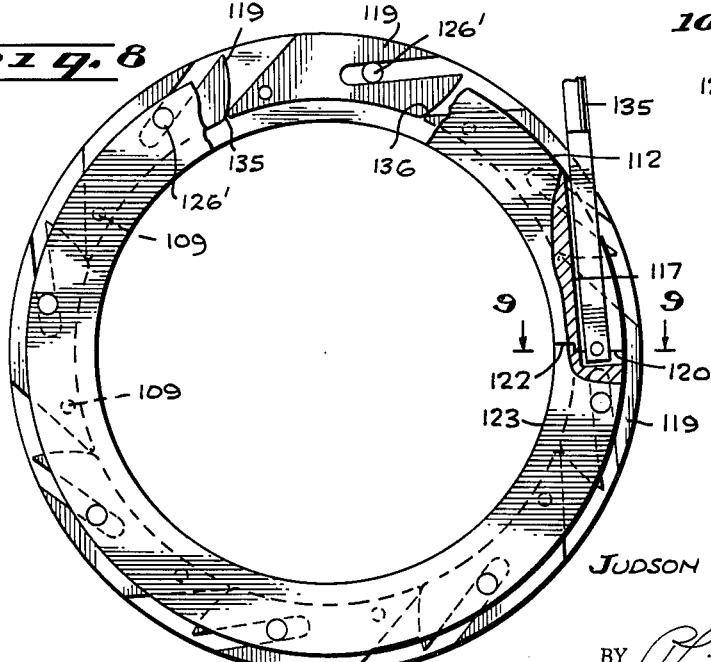

These and other objects of my invention will be understood from the following description of my invention, taken together with the drawings, of which:

FIG. 1 is a section taken through a turbine to which my invention is applied;
FIG. 2 is a section on line 2—2 of FIG. 1;
FIG. 3 is a section on line 3—3 of FIG. 2;
FIG. 4 is a fragmentary view of the nozzle ring elements of FIG. 2, showing the nozzle vanes in a displaced position;

FIG. 5 is a section on line 5—5 of FIG. 4;
FIG. 6 is a perspective view of a section of FIG. 4;
FIG. 7 is a section taken through the turbine showing a modification of my invention;
FIG. 8 is a section taken on line 8—8 of FIG. 7;
FIG. 9 is a section taken on line 9—9 of FIG. 8;
FIG. 10 is a section taken on line 10—10 of FIG. 8;
FIG. 11 is a detail of FIG. 8 showing nozzles in a displaced position;
FIG. 12 is a fragmentary section on line 12—12 of FIG. 11;
FIG. 13 is a perspective view of a nozzle.

In FIG. 1 the housing 1 is composed of a manifold section 2 and the turbine case section 3. The manifold section 2 has a fluid inlet 4 and a fluid outlet 5. The turbine case is mounted on a manifold section by suitably provided bolts 5′ in flanges 6 and 7. The turbine case carries a neck 8 terminating in a flange 9.

The turbine wheel 10 is mounted on a shaft 12 passing through packing 12′ positioned in the neck 8. The nozzle ring assembly 13 (see FIGS. 1 and 5) is mounted in the pilot 11 of the turbine case. The nozzle ring assembly is composed of an inner ring 14, carrying blade sections 15, cast integrally with the ring 14. The outer ring of the ring assembly is mounted slideably and concentrically on the inner ring. It is composed of an outer ring 16, carrying blade sections 17, integrally cast with the ring 16. Ring 16 is rotatably mounted on ring 14. The wheel cover 18 and ring 14 are clamped to the nozzle cover 19, which is seated in pilot 11. The wheel cover 18, ring 14 and nozzle cover 19 are connected to the turbine case 3 by means of the screws 20 (see FIG. 5). The wheel cover 18 forms a fluid-tight seal with the flange 5a of the outlet 5 (see O-rings). The blade sections 15 of the inner ring 14 make a fluid-tight seal with the cover 19.

The ring 16 is annularly recessed at its back side to form a stepped ring with a clearance having a wider portion 21 and a narrower portion 22. The ring 16 is also recessed part way in its inner bore away from the nozzle cover, by an underneath clearance 23. The seating surface between the rings 16 and 14 is thus at 24, contacting a portion only of the ring matching surfaces.

The ring 16 is notched at 25 at one of the vanes 17, i.e., 17′. The ring is also slotted across its width by a slot 26 which extends from the notch 25 across the vane marked 17′ and through the ring 16 in the space between the vane 17′ and the adjacent blade marked 16b. The slot terminates at the interface between the rings and in the space 14′, between the adjacent vanes 15 (see FIGS. 2, 4 and 6). The slot is shown as exaggerated in width for purposes of illustration only. It may, in fact, be merely a split in the ring, as, for example, a saw cut. The roller 27 is mounted in a notch 25 and is reciprocated angularly by the rocker arm 28, connected to the shaft 29, passing through a stuffing box 30 positioned in the turbine case 3 and in the flange 9.

The system, as illustrated in FIG. 2, shows a nozzle at its maximum opening. The nozzle throat is at 16c, i.e., at the narrowest opening between the surface 15′b and the opposing surface 16b. The complementary surfaces 15′b and 16′b fair into each other. It is not necessary for surfaces 16′b and 15′b to match closely, because the irregularity is upstream of the high-velocity zone in both of the positions shown in FIG. 1 and FIG. 2.

When the shaft 29 is rotated by the operator 31, for example, to move the roll 27 counterclockwise around the shaft 29 as a center, a tangential thrust is exerted on the nozzle surface 28′ (see FIGS. 2 and 4). This opposes such compressive force in the ring as results from external pneumatic pressure and tends to lift the ring off of the inner ring, and also gives it an angular moment. The high-pressure fluid in the turbine case 3 communicates through the clearances 21 and 22 with the clearance 23 between the rings. This tends to equalize or reduce the above-described external pneumatic load and reduce the tangential force required from roller 27 to move the ring, thus making the angular displacement of the ring 16 easier.

It will be seen that the slot 26 terminates at a point upstream of the turbine throat 16c, i.e., between the nozzle inlet 16′c and throat 16c. Thus, the pressure at the terminal end of the slot 26 is very little lower than in the case 3, and negligible loss results from leakage through the notch. The reciprocation of the roller 27 places a tangential thrust against the side of the notch and the side of the slot against which the roller operates. This tangential thrust results in a component of force which is directed radially of the ring 16 and in opposition to the fluid force exerted on the outer surface of 16 which is partially balanced by the force against the surface 23. This tends to reduce the friction between the rings due to the radial fluid force and facilitates the angular adjustment of the ring 16. The tangential thrust exerted on one side of the slot tends to lift the end of the split ring against which the thrust is exerted and thus aids in relieving the friction which resists the rotation of the ring.

Another consequence of the split construction of the ring is that it permits the ring to conform to the outer surface of the inner ring, notwithstanding machining tolerances of fit of the rings about each other or different temperature coefficients of expansion.

It will also be observed that, in the absence of the clearances 21 and 22, the fluid pressure in the turbine case 3 will act on the sections of the surface of ring 16 which lie between blades 17 in a direction to move the ring 16 away from nozzle cover 19. In addition to this force, there is some attenuated pressure between the contact faces of the blades 17 and the nozzle cover ring 19. This would produce a leakage path to by-pass the blades 17 and nozzle 16c. This total force is more than overcome by the counter-pressure exerted over the full area in clearances 21 and 22 by the pressure in case 3. The slot 22 also acts as a stop. If the stop should be in contact with wheel cover 18 and the pressure between the contacting faces is attenuated, the loss of force would be small, and there would still be enough force to push ring 16 back so blades 17 will contact cover ring 19. Thus, the fluid in 3 is directed through the nozzles of rings 14 and 17 and into the throat 16c of the turbine nozzle.

The consequence of this construction is that the ring 16 is forced against the nozzle cover 19, to form a fluid seal between the nozzle cover 19 and the contiguous surfaces of the blade sections, but also permitting rotation of the ring.

As the ring 16 is rotated about the ring 14, from the full open nozzle position of FIG. 2 to approach the closed nozzle position (see FIG. 4), the throat opening 16c at the narrowest point between the vanes 17 and 15 becomes less, thus reducing the fluid flow to the turbine.

The modification shown in FIGS. 7–10 employs the same manifold and turbine wheel as in the form of FIGS. 1–6, and it includes the same turbine wheel support. Similar parts are similarly numbered.

In the form of FIGS. 7–13, the turbine case 100 is connected by its flange 101 and sealed by O-rings 102 to the flange 7 of the manifold 2. The wheel cover 103 is bolted to the case 100, as described below. The nozzle blade ring cover 106 is set in a pilot in the turbine case 100. Spaced at regular intervals about the ring 106 are the bores 107. Positioned in the notch 110 in the turbine wheel cover 103 is a bearing ring 111, on which is seated the movable actuator ring 112, referred to also as the actuator ring. The actuator ring (see FIG. 12) is annularly recessed at its back side at 113, to give a wider passageway at 113, which acts as a stop as in the case of the similarly functioning portion 22 of FIG. 5. It is annularly recessed at 115 on its underneath side in the same manner as ring 16, and for like reasons as are described below.

The ring 112 is notched tangentially of the ring at 117, and a bore 118 through the ring is provided. The ring is slit by staggered slits such as a staggered saw cut.

FIG. 10 is an exaggerated view to show the relationship of the parts of the cut. The bore 118 is provided adjacent to one of the nozzle blades 119. The slot at 120 in the form of a saw-cut passes from the outer edge of the ring 112 radially through the bore 118, part way through the ring. The cut 122 passes through the ring from the inner edge 123 of the cut, so as to meet at the corners of 123. This provides an offset labyrinth cut through the ring 112 to minimize any fluid leakage through the slit.

Spaced about the ring 112 are a plurality of bores 124, in which are pressed pins 126' having a reduced end 125 and a head end of larger diameter, 126. Between the rings 112 and the nozzle cover ring 106 are a plurality of nozzle blades 119. These nozzle blades are substantially in the form of annular sections, with outer edges 127 and inner edges 128 substantially of the radius of the adjustable ring, positioned at spaced intervals about said rings 106 and 112 and the turbine wheel 10. The other edges 130 and 131 are positioned at an angle to each other. Edge 131 is disposed substantially on a chord of the annulus and edge 130 is arcuate to 17' of FIG. 4. The blades are hinged by means of the bores 132, in which the pin heads 109 are positioned. A cam slot 133 is provided in each of the nozzle blades 119. The cam pins 126' are positioned in the slots, with the heads 126 aligned with the heads 109.

A pin 134 passes through the flattened end of the rod 135 and the bore 118 in the actuator ring 112. (See FIGS. 8, 9 and 10.) The rod is positioned in the tangential slot 117, and extends through a stuffing box in the housing 136 to be actuated by a motor means not shown.

The wheel cover 103 carries four pilot lugs 103', spaced about the cover 100 in the section 2; one only is shown in FIG. 7. The lugs 103' position on the wheel cover 103 in the turbine case 100. The wheel cover 103 is clamped to the turbine case 100 by the screws 103a and spacers 103b.

As shown, and similar to the structures shown in FIGS. 1–6, the fluid pressure in the turbine case (see FIG. 12) is exerted on the exterior surface 112 and through the annular recesses 113 and 114 to the underneath annular recess 115. The net force pressing the ring 112 against the bearing ring 111 is the net force exerted by the pressure against an area equal to the contacting surface 110 at the bearing ring. This minimizes the friction opposing the angular adjustment of the ring 112 relative to the ring 106.

As in the previous form, the pressure in the passageways 113 and 114 creates a side thrust, forcing the actuator ring nozzles and nozzle cover against the turbine case cover 100 to seal the planes of separation between the actuating ring 112, the nozzle blades 119, and the ring 106, and the turbine case 100 against any substantial fluid leak. The ring 112, as is the case for ring 16, forms a floating sealing ring structure.

The adjustment of the ring 112 is made when a pressure is exerted by the rod 135 against the opposite side of the bore 118. This push, acting tangentially of the ring 118, tends to peel the ring in the same manner as described in connection with FIGS. 1–7, by exerting a tangential thrust which has an outward radial component at the slit end. This assists the ease of angular adjustment of the rings, as in the previous case.

Thus, when the ring 118 is adjusted by movement in a clockwise direction, the cam pin head 126 rides in the slot 133, and the nozzle blades rotate in the counterclockwise direction about the hinge pin head 109. Because of the alignment of the heads 126 and 129, the thrust of the rod 135 introduces no substantial side tilting action on the nozzle blades.

FIG. 8 shows the blades in the closed position with the nozzle throat 134' between the curved surface 135 and blade edge 136' closed.

When the blades 119 are rotated counterclockwise about the pin head 109, the nozzle throat 134' between the curved surface 135 moves counterclockwise and the blade edges 130 and 135 of the adjacent blade recede from each other. The nozzle throat 134' that is the space between 135 and the nearest surface at 135 of 130 is increased as the actuating ring is rotated counterclockwise, or decreased when rotated clockwise.

The geometry of the blades is such that the adjacent edges of each pair of adjacent blades, taken together with the complementary surfaces of the actuator ring and the stationary nozzle blade cover ring, form a plurality of nozzles having a throat section 134' and an entrance section 137 of larger cross-sectional area.

The two forms illustrated in FIGS. 1–6 and in FIGS. 7–13 are in this respect functionally similar.

While I have described a particular embodiment of my invention for purposes of illustration, it should be understood that various modifications and adaptations thereof may be made within the spirit of the invention, as set forth in the appended claims.

I claim:

1. A turbine assembly comprising a case, a fluid inlet passageway and a fluid outlet passageway in said case, a turbine wheel rotatably mounted on an axis in said case, a pair of rings coaxially mounted about said axis in said case, one of said rings being fixedly mounted in said case and the other of said rings mounted for angular adjustment relative to the other of said rings, a plurality of adjacent nozzle blades mounted on said rings at spaced intervals about said rings, means for altering the spacing between said nozzle blades, said means comprising a slot through said adjustable ring and means to apply a tangential thrust to said adjustable ring at one side of said slot and motion-transmitting connection between said blades and said adjustable ring whereby said nozzle blades are moved relative to each other and the spaces between adjacent rings are altered.

2. In the structure of claim 1, said motion-transmitting connection including a hinge mounting between said nozzle blades and one of said rings, a cam slot in each of said nozzle blades and a cam pin in the other of said rings and positioned in said cam slot, whereby on angular adjustment of said adjustable ring the blades are rotated on hinges by said pins to vary the separation between said blades.

3. In the assembly of claim 1, said adjustable ring having an outer surface in fluid communication with said inlet and an opposite inner ring surface, an annular recess in one end of said adjustable ring in fluid communication with said outer surface, an annular recess in the opposite inner surface of said adjustable ring in fluid communication with said first-mentioned annular recess.

4. In the assembly of claim 3, said motion-transmitting connection including a hinge mounting between said nozzle blades and one of said rings, a cam slot in each of said nozzle blades and a cam pin in the other of said rings and positioned in said cam slot, whereby on angular adjustment of said adjustable ring, the blades are rotated on hinges by said pins to vary the separation between said blades.

5. A turbine assembly comprising a case, a fluid inlet passageway, and a fluid outlet passageway in said case, a turbine wheel rotatably mounted on an axis in said case, a pair of rings coaxially mounted about said axis in said case, one of said rings being fixedly mounted in said case and the other of said rings mounted for angular adjustment relative to the other of said rings, a plurality of adjacent nozzle blades mounted on and between said rings, said adjustable ring having an outer surface in fluid communication with said inlet and an opposite inner ring surface, an annular recess in one end of said adjustable ring in fluid communication with said outer surface, an annular recess extending from the outer surface of said adjustable ring for at least a major portion of the radial thickness of said adjustable ring, whereby said adjustable ring may be forced axially by pressure in said inlet to seal the nozzle blades, and said adjustable ring having an inner surface, a cylindrical radially outwardly facing bearing surface in said case, at least a portion of said inner surface of said adjustable ring in bearing contact with said bearing surface, a second portion of said inner surface extending a substantial part of the axial thickness of said adjustable ring from the end opposite the nozzle blade, said second portion of said inner surface being spaced from said bearing surface and forming an annular recess between said last named portion and said bearing surface, said last named recess being in fluid communication with said first-mentioned annular recess whereby friction between said adjustable ring and said bearing surface is reduced when pressure is exerted in said inlet in fluid communication with said first-mentioned annular recess.

6. In the assembly of claim 5, said motion-transmitting connection including a hinge mounting between said nozzle blades and one of said rings, a cam slot in each of said nozzle blades and a cam pin in the other of said rings and positioned in said cam slot, whereby on angular adjustment of said adjustable ring, the blades are rotated on hinges on said pins to vary the separation between said blades.

7. In the assembly of claim 5, a bearing ring mounted in said case at said inner surface of said adjustable ring.

8. A turbine comprising a turbine case, a fluid inlet passageway in said case, a fluid outlet passageway in said case, a turbine wheel rotatably mounted in said case, an inlet nozzle ring assembly mounted in said case concentrically with said turbine wheel, said inlet nozzle ring including a ring fixedly mounted in said case, a second ring, an inner surface of said second ring contacting the outer surface of said first ring, said second ring mounted concentrically of said first mentioned ring for rotation with respect to said first named ring, each ring having separate nozzle blade sections fixedly mounted on said rings, said blade sections being spaced about said rings, a blade section on one of said rings being complementary to a blade section on the other of said rings, said blade sections forming together a nozzle blade, a nozzle ring cover mounted in said case and against the contiguous surface of the said blade sections, said blade sections and said cover forming a plurality of inlet nozzles spaced angularly about said turbine wheel, each of said nozzles having a throat section, said contacting surfaces positioned at said throats, and means for moving the second ring through an angle with respect to the first ring and said nozzle cover, whereby the opening between adjacent blade sections of said rings is varied to vary the throat opening of said nozzles, a slot through said second ring terminating at the contacting surface of said second ring between the adjacent blade sections positioned on said second ring at one of said nozzles and between the inlet to said nozzle and the throat of said nozzle, a notch in said second ring extending part way into said ring, said slot extending from said notch to the inner surface of said second ring, and said means to move said second ring including means to create a thrust against a wall of said notch to create a tangential thrust against said slotted second ring.

9. A turbine comprising a turbine case, a fluid inlet passageway in said case, a fluid outlet passageway in said case, a turbine wheel rotatably mounted in said case, an inlet nozzle ring assembly mounted in said case concentrically with said turbine wheel, said inlet nozzle ring including a ring fixedly mounted in said case, a second ring, an inner surface of said second ring contacting the outer surface of said first ring, said second ring mounted concentrically of said first mentioned ring for rotation with respect of said first named ring, each ring having separate nozzle blade sections fixedly mounted on said rings, said blade sections being spaced about said rings, a blade section on one of said rings being complementary to a blade section on the other of said rings, said blade sections forming together a nozzle blade, a nozzle ring cover mounted in said case and against the contiguous surface of the said blade sections, said blade sections and said cover forming a plurality of inlet nozzles spaced angularly about said turbine wheel, each of said nozzles having a throat section, said contacting surfaces positioned at said throats, and means for moving the second ring through an angle with respect to the first ring and said nozzle cover, whereby the opening between adjacent blade sections of said rings is varied to vary the throat opening of said nozzles, a slot through said second ring terminating at the contacting surface of said second ring between adjacent blade sections positioned on said second ring of one of said nozzles and between the inlet to said nozzle and the throat of said nozzle, a means to apply a tangential thrust to said second ring including a pin, positioned in said second ring at said slot, said slot extending through said ring to the inner surface of said second ring, and said means to move said pin to create a tangential thrust against said ring at said slot.

10. A turbine comprising a turbine case, a fluid inlet passageway in said case, a fluid outlet passageway in said case, a turbine wheel rotatably mounted in said case, an inlet nozzle ring assembly mounted in said case concentrically with said turbine wheel, said inlet nozzle ring including a ring fixedly mounted in said case, a second ring, an inner surface of said second ring contacting the outer surface of said first ring, said second ring mounted concentrically of said first mentioned ring for rotation with respect of said first named ring, each ring having separate nozzle blade sections fixedly mounted on said rings, said blade sections being spaced about said rings, a blade section on one of said rings being complementary to a blade section on the other of said rings, said blade sections forming together a nozzle blade, a nozzle ring cover mounted in said case and against the contiguous surface of the said blade sections, said blade sections and said cover forming a plurality of inlet nozzles spaced angularly about said turbine wheel, each of said nozzles having a throat section, said contacting surfaces positioned at said throats, and means for moving the second ring through an angle with respect to the first ring and said nozzle cover, whereby the opening between adjacent blade sections of said rings is varied to vary the throat opening of said nozzles, said second ring having a surface opposite to the surface of said second ring positioned contiguous to said nozzle cover, said nozzle cover being fixedly positioned in said case, and a fluid communication passageway from said turbine case to said surface, fluid communication between said turbine case and the outer rim of said second ring, said second ring having an annular recess at its inner surface adjacent the surface of said first ring, a fluid communication passageway in fluid communication with said first mentioned communication passageway to said first mentioned annular recess, whereby pressure equalization is established through said passageway between the outer rim of said second ring and at least a portion of the inner surface of said second ring, a slot through said second ring terminating at the contacting surface of said second ring between the adjacent blade sections positioned at said second ring at one of said nozzles and between the inlet to said nozzle and the throat of said nozzle, means to apply a tangential thrust to said second ring including a pin positioned in said ring at said slot, said slot extending through said ring to the inner surface of said second ring, and said means to move said pin to create a thrust against a wall of said notch to create a tangential thrust against said ring at said slot.

11. In a turbine comprising a turbine case, a fluid inlet passageway in said case, a fluid outlet passageway in said case, a turbine wheel rotatably mounted in said case between said inlet and outlet, a plurality of nozzles having variable throat openings mounted in said case between the said inlet and said turbine wheel and positioned at spaced intervals about said turbine wheel, the improvement which comprises a first ring fixedly mounted in said case concentrically of said turbine wheel, a second ring mounted in said case concentrically of said turbine wheel for angular rotation relative to said first ring, separate nozzle blade sections mounted in said first and second rings at angularly spaced intervals about said rings, a nozzle cover mounted in said case contiguous to said blades, the said nozzles being formed between adjacent blades and said nozzle cover, said nozzles including a throat section between adjacent blades, means to angularly adjust one of said rings with respect to the other of said rings to angularly adjust said blades to vary the said throat opening, said means including a slot through said second ring from the outer to the inner surface of said second ring, means to apply a tangential thrust to said second ring at one side of said slot.

12. In the turbine of claim 11, one of said rings having an outer surface in fluid communication with said inlet, and an inner ring surface, an annular recess in one end of said last named ring, in fluid communication with the fluid pressure at said outer surface, the opposite surface of said last named ring being in pressure communication with said nozzle cover whereby the fluid pressure presses the last named ring and said nozzle blades against said nozzle cover.

13. In the turbine of claim 12, an annular recess in the inner surface of said last named ring in fluid communication with said first mentioned annular recess.

14. The turbine assembly of claim 1, said nozzle blades being mounted on one end of said adjustable ring, and said adjustable ring having an outer surface in fluid communication with said inlet, a fluid communication between said outer surface and the other end of said adjustable ring.

15. The turbine assembly of claim 14, said motion-transmitting connection including a hinge mounting between said nozzle blades and one of said rings, a cam slot in each of said nozzle blades and a cam pin in the other of said rings and positioned in said cam slot, whereby on angular adjustment of said adjustable ring, the blades are rotated on hinges by said pins to vary the separation between said blades.

16. A turbine assembly comprising a case, a fluid inlet passageway, and a fluid outlet passageway in said case, a turbine wheel rotatably mounted on an axis in said case, a pair of rings coaxially mounted about said axis in said case, one of said rings being fixedly mounted in said case and the other of said rings mounted for angular adjustment relative said one of said rings, a plurality of adjacent nozzle blades mounted on and between said rings, said adjustable ring having an outer surface in fluid communication with said inlet and an opposite inner ring surface, an annular recess extending from the outer surface of said adjustable ring at least a major portion of the radial thickness of said adjustable ring, said annular recess being in fluid communication with said outer surface and said inlet whereby pressure in said inlet is communicated to said annular recess to force the said adjustable ring axially to seal said nozzle blade, a cylindrically outwardly facing bearing surface in said case, a portion of said inner surface of said adjustable ring in bearing contact with the bearing surface, a second portion of said inner surface extending a substantial part of the axial thickness of said adjustable ring from the end opposite the nozzle blades, said second portion of said inner surface being spaced from said bearing surface and forming an annular recess between said last named portion and said bearing surface, said last named recess being in fluid communication with said first-mentioned annular recess whereby friction between said adjustable ring and said bearing surface is reduced when pressure is exerted in said inlet.

17. The assembly of claim 16, said motion-transmitting connection including a hinge mounting between said nozzle blades and one of said rings, a cam slot in each of said nozzle blades and a cam pin in the other of said rings and positioned in said cam slot, whereby on angular adjustment of said adjustable ring, the blades are rotated on hinges by said pins to vary the separation between said blades.

References Cited by the Examiner

UNITED STATES PATENTS

| 205,145 | 6/1878 | Schuessler | 253—123 |
| 908,227 | 12/1908 | Elling | 230—114 |
| 1,017,716 | 2/1912 | Vonaesch | 253—122 |
| 1,270,674 | 6/1918 | Videla | 253—110 |
| 2,341,974 | 2/1944 | Browne | 230—114 |

FOREIGN PATENTS 731,822  6/1955  Great Britain.

MARK NEWMAN, *Primary Examiner.*

SAMUEL LEVINE, *Examiner.*